United States Patent
Ishibashi et al.

(10) Patent No.: US 8,303,828 B2
(45) Date of Patent: Nov. 6, 2012

(54) METHOD FOR MANUFACTURING MAGNETIC RECORDING MEDIUM AND MAGNETIC RECORDING-REPRODUCING APPARATUS

(75) Inventors: Shinichi Ishibashi, Tokyo (JP); Masato Fukushima, Chiba (JP); Akira Yamane, Ichihara (JP)

(73) Assignee: Showa Denko K.K., Tokyo (JP)

( * ) Notice: Subject to any disclaimer, the term of this patent is extended or adjusted under 35 U.S.C. 154(b) by 374 days.

(21) Appl. No.: 12/626,380

(22) Filed: Nov. 25, 2009

(65) Prior Publication Data

US 2010/0182717 A1 Jul. 22, 2010

(30) Foreign Application Priority Data

Dec. 1, 2008 (JP) ................. P2008-306654

(51) Int. Cl.
*B44C 1/22* (2006.01)
(52) U.S. Cl. ............. 216/22; 216/40; 216/67; 216/88; 427/526; 427/130
(58) Field of Classification Search ............. None
See application file for complete search history.

(56) References Cited

U.S. PATENT DOCUMENTS

| | | | |
|---|---|---|---|
| 6,996,894 B2* | 2/2006 | Hsiao et al. ............ | 29/603.12 |
| 7,067,207 B2 | 6/2006 | Kamata et al. | |
| 7,118,680 B2* | 10/2006 | Chang et al. ............ | 216/22 |
| 7,147,790 B2* | 12/2006 | Wachenschwanz et al. .... | 216/22 |
| 7,161,753 B2 | 1/2007 | Wachenschwanz et al. | |
| 7,311,850 B2* | 12/2007 | Kamijima et al. ............ | 216/22 |
| 7,549,209 B2 | 6/2009 | Wachenschwanz et al. | |
| 8,048,323 B2* | 11/2011 | Fukushima et al. ............ | 216/22 |
| 8,139,303 B2* | 3/2012 | Sakawaki et al. ............ | 360/48 |
| 2006/0269796 A1 | 11/2006 | Hyodo | |
| 2008/0187779 A1 | 8/2008 | Horiguchi | |
| 2008/0226946 A1 | 9/2008 | Moribe et al. | |

FOREIGN PATENT DOCUMENTS

| | | |
|---|---|---|
| JP | 05-205257 A | 8/1993 |
| JP | 2004-164692 A | 6/2004 |
| JP | 2004-178793 A | 6/2004 |
| JP | 2004-178794 A | 6/2004 |

(Continued)

OTHER PUBLICATIONS

Japanese Notice of Reasons for Rejection issued in Japanese Application No. 2008-306654 mailed Sep. 4, 2012.

*Primary Examiner* — Anita Alanko
(74) *Attorney, Agent, or Firm* — Sughrue Mion, PLLC

(57) ABSTRACT

Provided is a method for manufacturing, in a simple process, a magnetic recording medium having a distinct magnetic recording pattern formed thereon. A method for manufacturing a magnetic recording medium having a magnetically-separated magnetic recording pattern MP, the method at least including; a first step of forming a first magnetic layer 11 on a non-magnetic substrate 10; a second step of forming a resist layer 12 on the first magnetic layer 11, the resist layer 12 being patterned in correspondence with the magnetic recording pattern MP; a third step of forming a second magnetic layer 13 so as to cover a surface of the first magnetic layer 11 having the resist layer 12 formed thereon; a fourth step of removing the resist layer 12 together with the second magnetic layer 13 formed thereon; and a fifth step of partially removing the first magnetic layer 11 or partially modifying magnetic property of the first magnetic layer 11.

8 Claims, 3 Drawing Sheets

FOREIGN PATENT DOCUMENTS

| | | |
|---|---|---|
| JP | 2006-209952 A | 8/2006 |
| JP | 2006-309841 A | 11/2006 |
| JP | 2006-331578 A | 12/2006 |
| JP | 2007-328908 A | 12/2007 |
| JP | 2008-135092 A | 6/2008 |
| JP | 2008-204529 A | 9/2008 |
| JP | 2008-217959 A | 9/2008 |
| JP | 2008-226395 A | 9/2008 |
| JP | 2008-287811 A | 11/2008 |

* cited by examiner

METHOD FOR MANUFACTURING MAGNETIC RECORDING MEDIUM AND MAGNETIC RECORDING-REPRODUCING APPARATUS

CROSS REFERENCE TO RELATED APPLICATION

Priority is claimed on Japanese Patent Application No. 2008-306654, filed Dec. 1, 2008, the content of which is incorporated herein by reference.

BACKGROUND OF THE INVENTION

1. Field of the Invention

The present invention relates to a method for manufacturing a magnetic recording medium used for a hard disk device (HDD) or other devices and to a magnetic recording-reproducing apparatus.

2. Description of the Related Art

Recently, applicability of magnetic recording devices, such as magnetic disk devices, flexible disk devices and magnetic tape devices, has increased significantly and their importance has also increased. Recording density of magnetic recording media used for these devices has been increased significantly. With the advent of a magnetoresistive head and partial response maximum likelihood (PRML) technology, surface recording density has improved still more significantly. In recent years, recording heads, such as GMR heads and TMR heads, have also been introduced, which further increase the surface recording density by about two-fold a year.

There is a demand to further increase recording density of these magnetic recording media. It is therefore necessary to increase coercive force, a signal-to-noise ratio (SNR) and resolution of magnetic layers. In recent years, efforts have been made to increase surface recording density by increasing linear recording density and track density.

The most recent magnetic recording media have track density of as high as 110 kTPI. As the track density increases, however, magnetic recording information between adjacent tracks begins interfering with each other, which may easily cause a problem that a magnetizing transition area of a border area becomes a noise source that decreases the SNR. The decrease in the SNR causes a decrease in a bit error rate, which is an obstacle to an improvement in recording density.

In order to increase surface recording density, it is necessary to provide reduced-sized recording bits on the magnetic recording medium, each recording bit having maximum possible saturation magnetization and maximum possible magnetic film thickness. There is a problem, however, that the reduced-sized recording bit has a small magnetizing minimum volume per 1 bit and recorded data may disappear due to flux reversal caused by heat fluctuation.

Since adjacent tracks are close to each other in a high track density configuration, a significantly precise track servo technique is necessary for a magnetic recording device. Usually, information is recorded on a larger number of tracks and reproduced in a smaller number of tracks in order to avoid influence from adjacent tracks as much as possible. In this manner, however, although influence between the tracks can be controlled to the minimum, it is difficult to obtain a sufficient reproduction output and thus to provide a sufficient SNR.

In order to avoid a heat fluctuation problem, provide a sufficient SNR and to provide sufficient output, an attempt has been made to form an uneven configuration along the tracks on the surface of the recording medium so as to physically separate the recording tracks from one another to increase the track density. Such a technique is usually called a discrete track process and a magnetic recording medium manufactured by that method is called a discrete track medium. An attempt has also been made to provide a "patterned medium" which has further divided data areas in a track.

An exemplary discrete track medium is a magnetic recording medium, which is formed on a non-magnetic substrate on which an uneven pattern is formed. On the magnetic recording medium, a physically-separated magnetic recording track and a servo signal pattern are formed (see, for example, Patent Document 1).

The disclosed magnetic recording medium includes a ferromagnetic layer formed on an uneven configuration of a substrate via a soft magnetic layer. A protective film is formed on the surface of the ferromagnetic layer. The magnetic recording medium has, in its projecting area, a magnetic recording area which is physically separated from the surrounding areas.

In the disclosed magnetic recording medium, since formation of a magnetic wall in the soft magnetic layer can be avoided and influence of the heat fluctuation can be prevented, there is no interference between adjacent signals. Thus, a high-density magnetic recording medium with less noise can be provided.

The discrete track process includes forming tracks after a magnetic recording medium consisting of several thin film layers is formed, or forming an uneven pattern directly on a substrate surface or on a thin film layer for forming tracks and then forming a thin magnetic recording medium film (see, for example, Patent Documents 2 and 3).

The former process, a magnetic layer process, has a following problem. Since physical processing is performed on a surface of a finished medium, the medium is easily contaminated during the manufacturing process and the manufacturing process becomes significantly complicated. The latter process, an embossing process, also has a following problem. Although the medium is not easily contaminated during the manufacturing process, since an uneven configuration formed on a substrate is taken over to a film formed thereon, levitation pose and levitation height of a head which records and reproduces on a medium become unstable.

As another approach, a method of forming an area between magnetic tracks of a discrete track medium by injecting nitrogen ions and oxygen ions into a previously formed magnetic layer or by irradiating with laser so as to change property of that area is disclosed (see, for example, Patent Documents 4 to 6).

[Patent Document 1] Japanese Unexamined Patent Application, First Publication No. 2004-164692
[Patent Document 2] Japanese Unexamined Patent Application, First Publication No. 2004-178793
[Patent Document 3] Japanese Unexamined Patent Application, First Publication No. 2004-178794
[Patent Document 4] Japanese Unexamined Patent Application, First Publication No. H5-205257
[Patent Document 5] Japanese Unexamined Patent Application, First Publication No. 2006-209952
[Patent Document 6] Japanese Unexamined Patent Application, First Publication No. 2006-309841

In manufacturing a discrete track medium or a patterned medium having a magnetically-separated magnetic recording pattern described above, the magnetic layer is patterned by the following methods (1) and (2).

(1) A patterned mask layer is formed on a surface of a magnetic layer and the magnetic layer is physically processed through ion milling or other means using the mask layer.

(2) A magnetic layer is partially doped with ions with a mask layer provided thereon and magnetic property of the magnetic layer is partially modified to form a magnetic recording pattern.

The method (1) has, however, a problem that since the mask layer itself is etched by the ions when the magnetic layer is subject to ion milling, an edge portion of the mask layer is formed in a forward tapered shape. An angle of a portion of the forward tapered shape with respect to the vertical direction becomes gradually large so that a cross-section of the magnetic layer to be processed may be formed in a forward tapered shape. In this case, since the edge portion of the magnetic layer is formed in a forward tapered shape, which may provide ill-defined boundaries in the magnetic recording pattern.

The method (2) also has a problem that, during ion doping into the magnetic layer, the mask layer is etched by the ions and an ill-defined pattern of the mask layer is gradually formed. Further, the doped ions are scattered in the magnetic layer, which may provide ill-defined boundaries in the magnetic recording pattern.

SUMMARY OF THE INVENTION

The invention is made in view of the aforementioned related art problems. An object of the invention is to provide a method for manufacturing a magnetic recording medium having a distinct magnetic recording pattern in a simple process and a magnetic recording-reproducing apparatus which incorporates a magnetic recording medium having improved electromagnetic conversion property manufactured in the method described above.

In order to solve the related art problems, the inventors studied intensively and found that a magnetic recording medium having a distinct magnetic recording pattern can be manufactured in the following manner. In a step of forming a patterned magnetic layer, a magnetic layer is formed on a patterned resist layer without processing border areas of continuous magnetic layers through ion milling or other means or modifying magnetic property of these areas through ion doping, and the resist layer is then removed. On the basis of this knowledge, the invention has been completed.

The invention provides the following means.

(1) A method for manufacturing a magnetic recording medium having a magnetically-separated magnetic recording pattern, the method at least including;

a first step of forming a first magnetic layer on a non-magnetic substrate;

a second step of forming a resist layer on the first magnetic layer, the resist layer being patterned in correspondence with the magnetic recording pattern;

a third step of forming a second magnetic layer so as to cover a surface of the first magnetic layer having the resist layer formed thereon;

a fourth step of removing the resist layer together with the second magnetic layer formed thereon; and a fifth step of partially removing the first magnetic layer or partially modifying magnetic property of the first magnetic layer.

(2) A method for manufacturing a magnetic recording medium according to (1), wherein, in the fifth step, a portion of the first magnetic layer is removed where the first magnetic layer is not covered with the second magnetic layer or, alternatively, magnetic property of that portion of the first magnetic layer is modified.

(3) A method for manufacturing a magnetic recording medium according to (2), wherein a thickness of the second magnetic layer of the magnetic recording medium is not less than 0.5 nm to not more than 10 nm.

(4) A method for manufacturing a magnetic recording medium according to any one of (1) to (3), wherein, in the fifth step, a surface layer of the first magnetic layer is removed and magnetic property of an underlying layer at the removed portion is modified.

(5) A method for manufacturing a magnetic recording medium according to (4), wherein, in the fifth step, the surface layer of the first magnetic layer is removed and magnetic property of the underlying layer at the removed portion is modified through irradiation of ion beams.

(6) A method for manufacturing a magnetic recording medium according (5), further including a step of forming a protective layer without burying a non-magnetic material at a portion where the first magnetic layer is removed through irradiation of ion beams.

(7) A method for manufacturing a magnetic recording medium according to any one of (1) to (6), further including, between the third step and the fourth step, a step of removing the second magnetic layer until the resist layer is exposed and planarizing the surface.

(8) A method for manufacturing a magnetic recording medium according to any one of (1) to (7), wherein the first magnetic layer has a granular structure and the second magnetic layer has a non-granular structure.

(9) A magnetic recording-reproducing apparatus including:

the magnetic recording medium according to any one of (1) to (8);

a medium driving section for driving the magnetic recording medium in a recording direction;

a magnetic head which records onto and reproduces from the magnetic recording medium;

a head moving unit for moving the magnetic head relative to the magnetic recording medium; and a recording and reproducing signal processing unit for inputting signals to the magnetic head and reproducing signals output from the magnetic head.

As described above, according to the invention, since a magnetic recording medium having a distinct magnetic recording pattern can be manufactured in a simple process, a magnetic recording medium with high recording density can be manufactured with high productivity. A magnetic recording-reproducing apparatus incorporating such a magnetic recording medium has further improved electromagnetic conversion property.

REFERENCE NUMERALS

Figure 1:
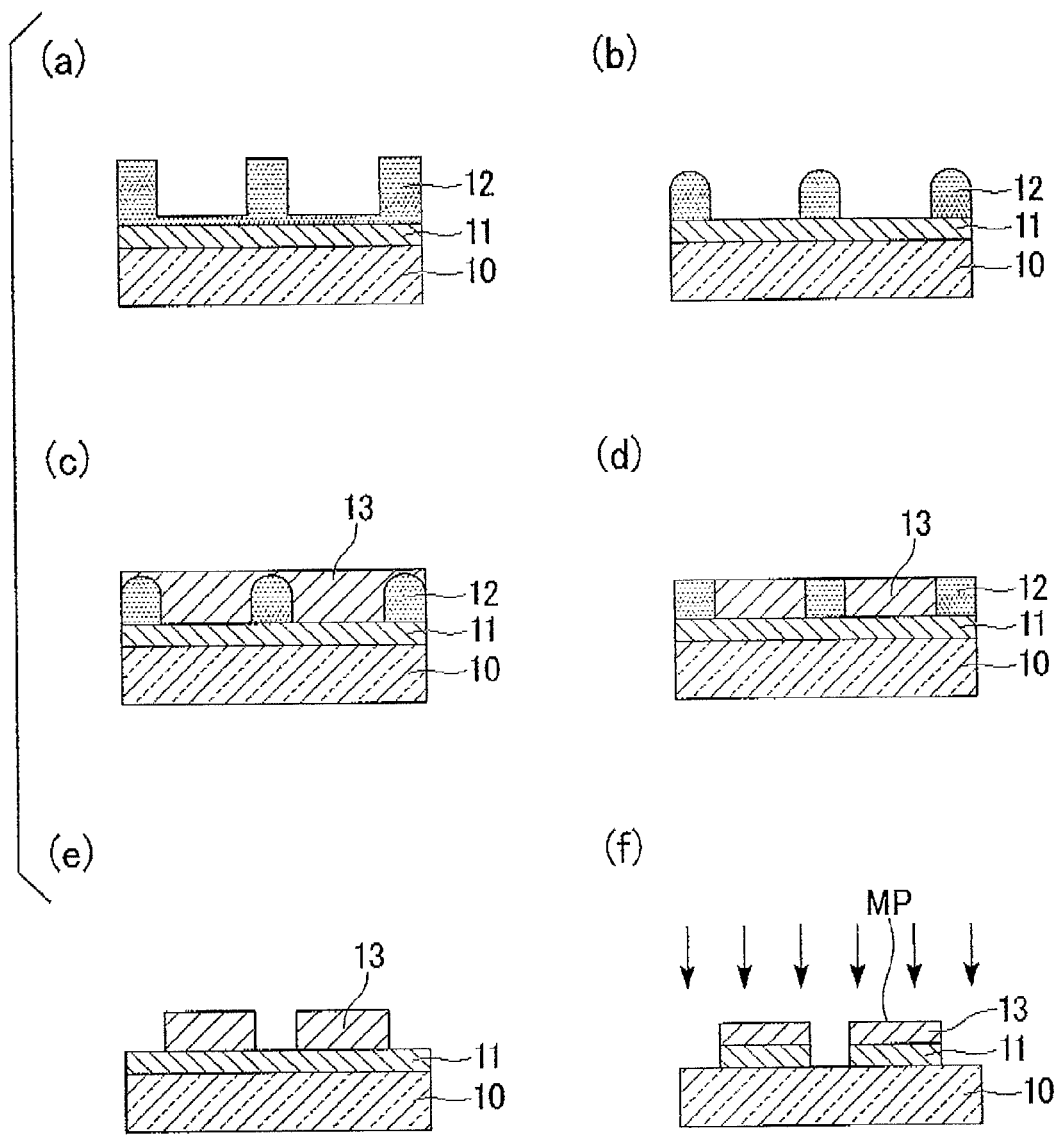
FIG. 1 is a cross-sectional view illustrating a method for manufacturing a magnetic recording medium to which the invention is applied.

1: non-magnetic substrate
2: soft magnetic layer

3: intermediate layer
4: magnetic recording layer
4a: first magnetic layer
4b: second magnetic layer
5: protective layer
MP: magnetic recording pattern
10: non-magnetic substrate
11: first magnetic layer
12: resist layer
13: second magnetic layer
30: magnetic recording medium
31: medium driving section
32: magnetic head
33: head driving section
34: recording and reproducing signal system

DETAILED DESCRIPTION OF THE INVENTION

Referring now to the drawings, embodiments of the invention will be described in detail.

For the ease of illustration, characteristic features in the drawings referred to in the following description are expanded in some drawings. Accordingly, components are not necessarily illustrated in actual dimensional ratios.
(Method for Manufacturing Magnetic Recording Medium)

The invention is a method for manufacturing a magnetic recording medium having a magnetically-separated magnetic recording pattern. As illustrated in FIGS. 1(a) to 1(f), for example, the method includes a first step of forming a first magnetic layer 11 on a non-magnetic substrate 10; a second step of forming a resist layer 12 on the first magnetic layer 11, the resist layer 12 being patterned in correspondence with the magnetic recording pattern MP; a third step of forming a second magnetic layer 13 so as to cover a surface of the first magnetic layer 11 having the resist layer 12 formed thereon; a fourth step of removing the resist layer 12 together with the second magnetic layer 13 formed thereon; and a fifth step of partially removing the first magnetic layer 11 or partially modifying magnetic property of the first magnetic layer 11.

In particular, such a magnetic recording medium is manufactured in the following manner. As illustrated in FIG. 1(a), a first magnetic layer 11 is first formed on a non-magnetic substrate 10. A resist layer 12 patterned in correspondence with a magnetic recording pattern MP is then formed on the first magnetic layer 11 through photolithography, nanoimprinting or other means.

Preferably, the resist layer 12 is patterned through nanoimprinting. In a nanoimprinting process, a radiation-curable material is used for the resist layer 12 and a pattern is transferred to the resist layer 12 using a stamp.

Preferably, the resist layer 12 is irradiated with radiation after the pattern is transferred. In this manner, the stamp configuration can be transferred sufficiently precisely to the resist layer 12. The magnetic recording pattern MP can therefore be formed with improved formation property.

In particular, the stamp configuration can be transferred sufficiently precisely in the following manner. The stamp is pressed against the resist layer 12 while the resist layer 12 is highly flowable. In this state, the resist layer 12 is irradiated and cured with radiation. The stamp is then removed from the resist 12. In this manner, the stamp configuration can be transferred sufficiently precisely to the resist layer 12.

The resist layer 12 may be irradiated with radiation in the following manner while the stamp is pressed against the resist layer 12. For example, the resist layer 12 may be irradiated with radiation at an opposite side of the stamp, i.e., a side of the non-magnetic substrate 10. Alternatively, the stamp may be made of a radiation-transmissive material and the resist layer 12 may be irradiated with radiation at the side of the stamp. Alternatively, the resist layer 12 may be irradiated with radiation from a side surface of the stamp. Alternatively, radiation which is highly conductive with respect to a solid material, such as heat rays, may be employed and the resist layer 12 is irradiated with radiation by heat conduction through the stamp material or the non-magnetic substrate 10.

Radiation used herein may be a wide range of electromagnetic waves, such as heat rays, visible light, ultraviolet rays, X-rays and gamma rays. The radiation-curable material may be heat-curing resin for heat rays and ultraviolet-curing resin for ultraviolet rays.

Among these, ultraviolet curing resin, such as Novolak-based resin, acrylic esters and acrylic epoxys, are preferably used as the resist layer 12 and glass or resin which are highly transmissive to ultraviolet rays are preferably used as the stamp material.

In the step of transferring the pattern described above, a stamper can be employed which has a fine track pattern formed by, for example, electron beam lithography, on a metal plate. Ni, which satisfies hardness and durability demands for the process described above, may be employed as a stamper. However, any materials may be employed as long as they achieve the object described above. In addition to the tracks for recording data, servo signal patterns, such as a burst pattern, a gray code pattern and a preamble pattern, can be formed with the stamp.

After the pattern is transferred, the resist layer 12 is removed through ion milling or other means, until the first magnetic layer 11 is exposed as illustrated in FIG. 1(b).

Next, as illustrated in FIG. 1(c), the second magnetic layer 13 is formed so as to cover a surface of the first magnetic layer 11 on which the resist layer 12 is formed. The second magnetic layer 13 functions as a mask layer when the first magnetic layer 11 is irradiated with ion beams, which will be described later. Preferably, the second magnetic layer 13 is highly resistive to ions used for irradiation.

As illustrated in FIG. 1(d), it is preferable in the invention that the second magnetic layer 13 be removed until the resist layer 12 is exposed and the surface of the second magnetic layer 13 be planarized before the resist layer 12 is removed. In this step, the non-magnetic substrate 10 may be irradiated with ions from an oblique direction during ion milling or the non-magnetic substrate 10 may be selectively etched or mechanically polished using a surface plate and an abrasive. With this step, an edge configuration of the second magnetic layer 13 is controlled so as to provide a distinct configuration of the magnetic recording pattern MP, which will be described later.

Next, as illustrated in FIG. 1(e), the resist layer 12 is removed together with the second magnetic layer 13 formed thereon. The first magnetic layer 11 is thus exposed from the second magnetic layer 13 remaining thereon.

Next, as illustrated in FIG. 1(f), a portion of the first magnetic layer 11 is removed where the first magnetic layer 11 is not covered with the second magnetic layer 13. Alternatively, magnetic property of that portion of the first magnetic layer 11 is modified. In this manner, a magnetically-separated magnetic recording pattern MP is obtained. FIG. 1(f) illustrates a magnetic recording pattern MP consisting of the first and second magnetic layers 11 and 13. The first and second magnetic layers 11 and 13 are magnetically separated when the first magnetic layer 11 is removed at a portion where the first magnetic layer 11 is not covered with the second magnetic layer 13.

It is preferable in the invention to remove a surface layer of the first magnetic layer 11 and modify magnetic property of an underlying layer at the removed portion.

In the invention, modifying magnetic property includes partially doping ions into the magnetic layer through ion beam irradiation so as to eliminate magnetic property in the ion-doped area or decreasing coercive force (Hc) and saturation magnetization (Ms) of that area.

In particular, in the invention, only a surface layer of the first magnetic layer 11 is removed through ion milling or other means in a portion where the first magnetic layer 11 is magnetically separated so as to form the magnetic recording pattern MP. An underlying layer irradiated with ion beams in a portion where the surface layer is removed. In this manner, coercive force (Hc) and saturation magnetization (Ms) of the underlying layer are decreased and magnetic property thereof is modified.

In the invention, a mixture of nitrogen ions and hydrogen ions, or a mixture of nitrogen ions and neon may be used as the ion beams. In this manner, a step of etching the first magnetic layer 11 and a step of modifying magnetic property of the underlying layer can be performed at the same time to provide an efficient manufacturing process.

Argon is usually employed for the ion beam etching. Although argon can be used for high-speed etching of the magnetic layer, it is significantly difficult to simultaneously provide argon-etching and modification of magnetic property of the underlying layer.

With the processes described above, a magnetic recording medium having a distinct magnetic recording pattern can be manufactured in a simple process. Therefore, a magnetic recording medium with high recording density can be manufactured with high productivity.

Figure 2:
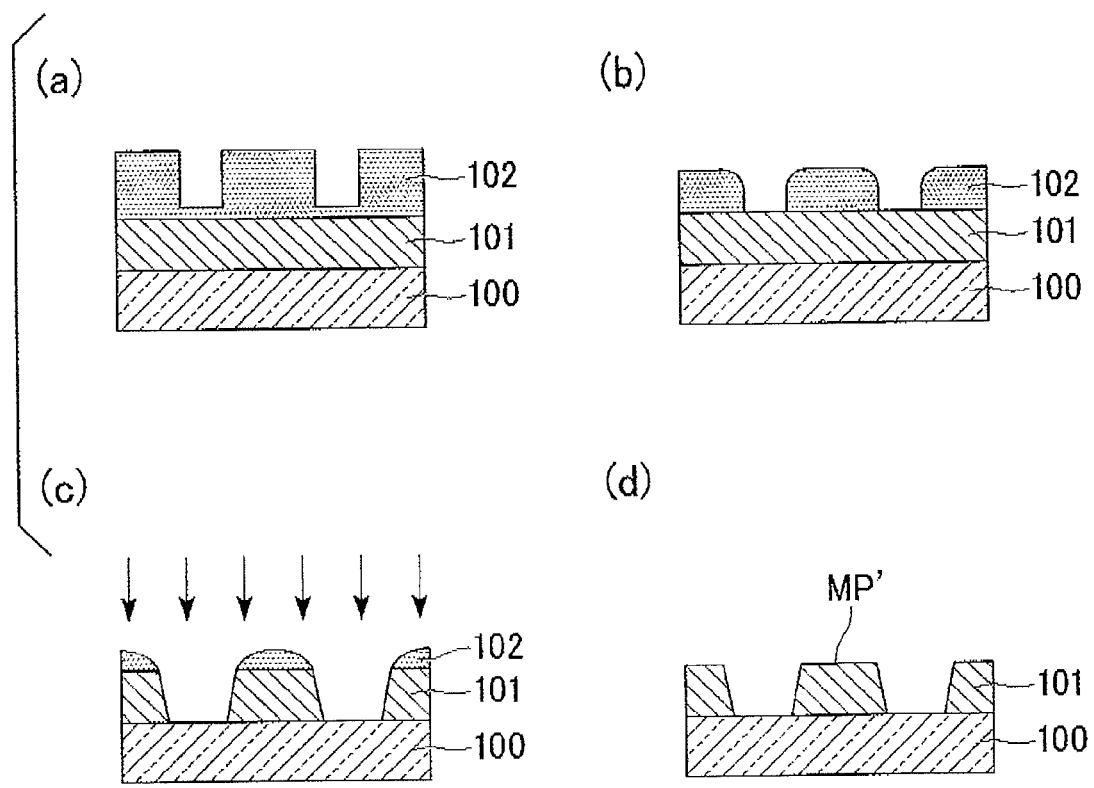
FIG. 2 is a cross-sectional view illustrating a method for manufacturing a related art magnetic recording medium.

Hereinafter, a method for manufacturing a related art magnetic recording medium will be described with reference to FIG. 2.

As illustrated in FIG. 2(a), a first magnetic layer 101 is first formed on a non-magnetic substrate 100. A resist layer 102 patterned in correspondence with a magnetic recording pattern MP' is formed on the first magnetic layer 101 through photolithography, nanoimprinting or other means. As illustrated in FIG. 2(b), the resist layer 102 is removed through ion milling or other means until the magnetic layer 101 is exposed after the pattern is transferred.

Next, as illustrated in FIG. 2(c), a portion of the magnetic layer 101 is removed where the magnetic layer 101 is not covered with the resist layer 102. Alternatively, magnetic property of that portion of the magnetic layer 101 is modified. In this manner, a magnetically-separated magnetic recording pattern MP' as illustrated in FIG. 2(d) is provided. FIG. 2(c) illustrates a magnetic recording pattern MP' consisting of the magnetic layer 101. The magnetic layer 101 is magnetically separated when a portion of the magnetic layer 101 is removed where the magnetic layer 101 is not covered with the resist layer 102.

In the related art manufacturing method, since the mask layer 102 itself is etched by the ions when the magnetic layer 101 is processed through ion milling, an edge portion of the mask layer 102 is formed in a forward tapered shape. An angle of a portion of the forward tapered shape with respect to the vertical direction gradually becomes large so that a cross-section of the magnetic layer 101 to be processed may be formed in a forward tapered shape.

In the related art manufacturing method, it is necessary to provide the mask layer 102 on a surface of the magnetic layer 101 to provide ion milling or other means partially. In this manner, the mask layer 102 is etched through ion milling or other means to provide an ill-defined mask pattern. An ill-defined magnetic recording pattern MP' may be provided resultantly. The magnetic layer 101 is usually made of polycrystalline alloy. Since polycrystalline alloy includes a large amount of substances with different ion etching rates and injection efficiency, it is difficult to provide a magnetic layer 101 having a distinct pattern even through ion milling or other means.

As compared to the related art method, the method of manufacturing the magnetic recording medium to which the invention is applied includes the following steps. A negative pattern of the magnetic recording pattern MP is formed on the first magnetic layer 11 using the resist layer 12. A second magnetic layer 13 is formed on the first magnetic layer 11 which has the resist layer 12 formed thereon. The resist layer 12 is then removed together with the second magnetic layer 13 formed thereon. In this manner, a distinct magnetic recording pattern MP having an inverted configuration of that of the resist layer 12 can be formed when the first magnetic layer 11 is partially removed or magnetic property of the first magnetic layer 11 is partially modified.

The resist layer 12 is reliable in semiconductor processes to form fine patterns or remove layers with fewer residual substances. The resist layer 12 provides greater configuration controlling property and removing property as compared with processing the magnetic layer 101.

In the invention, a portion of the first magnetic layer 11 may be partially removed where the first magnetic layer 11 is not covered with the second magnetic layer 13 or magnetic property of that portion may be modified. In this manner, the first and second magnetic layers 11 and 13 may be formed as a multilayer structure, which is used for manufacturing a magnetic recording medium having various electromagnetic conversion properties.

In the invention, the first magnetic layer 11 has a granular structure and the second magnetic layer 13 has a non-granular structure. With this configuration, ions can be doped into the first magnetic layer 11 easily and the first magnetic layer 11 can be processed or modified through ion milling or other means easily. At the same time, the second magnetic layer 13 can be highly resistive to ions.

In the invention, the first magnetic layer 11 can be removed to a slight depth through ion milling or other means. It is thus possible to form a protective layer at a portion from which the first magnetic layer 11 is removed without burying a non-magnetic material. In this manner, the magnetic recording medium can be manufactured in a simple process.

In a related art manufacturing method, however, it is necessary to etch the magnetic layer 101 deeply during patterning the magnetic layer 101. If the etched portion remains on the surface of the magnetic recording medium, a turbulent air flow may be generated by a magnetic head travelling above an uneven etched portion. As a result, the magnetic head cannot travel in a stable, levitated manner.

On the contrary, in the invention, the first magnetic layer 11 is removed to a slight depth through ion beam milling. Even if a protective layer, such as a hard carbon film, is directly formed on the first magnetic layer 11 and an uneven configuration remains on the surface of the magnetic recording medium, the magnetic head can travel in a stable, levitated manner because of the slight uneven configuration on the surface.

According to the invention, the step of burying a non-magnetic material and a step of planarizing a surface after a non-magnetic material is buried can be eliminated. It is therefore possible to significantly increase manufacturing efficiency of the magnetic recording medium.

The resist layer 12 can be removed (i.e., lifted off) together with the second magnetic layer 13 formed thereon so as to expose the magnetic recording pattern MP from the second magnetic layer 13. In order to provide a distinct pattern of the second magnetic layer 13, however, it is preferable that the second magnetic layer 13 be removed until the resist layer 12 is exposed and the surface be planarized before the resist 12 is removed. With these steps, an edge configuration of the second magnetic layer 13 is controlled so as to provide a distinct magnetic recording pattern MP.

In the invention, in a process of forming the magnetic recording pattern MP, it is preferable that a surface layer of the first magnetic layer 11 be removed only in a portion where the first magnetic layer 11 is to be magnetically separated and an underlying layer of the removed portion be irradiated with ion beams.

In this case, in the step of forming a magnetically-separated magnetic recording pattern MP, a processing amount of the magnetic layer through ion milling can be very small because coercive force (Hc) and saturation magnetization (Ms) of the underlying layer are decreased and magnetic property is modified. It is therefore possible to obtain a magnetic recording medium having a clean surface and an amount of dust generation can be controlled. In this manner, coercive force and residual magnetization of areas between magnetic tracks can be reduced to the upmost limit. As a result, it is possible to eliminate bleeding during writing for magnetic recording and to obtain a magnetic recording medium with high surface recording density.

(Magnetic Recording Medium)

Next, a configuration of the magnetic recording medium manufactured in accordance with the invention will be described in detail with reference to an exemplary discrete magnetic recording medium 30 illustrated in FIG. 3.

The magnetic recording medium 30 described below is illustrative only and the magnetic recording medium manufactured in accordance with the invention is not limited to the same. Configurations other than those of the non-magnetic substrate 10 and the first and second magnetic layers 11 and 13 may be appropriately changed during implementation of the invention.

Figure 3:
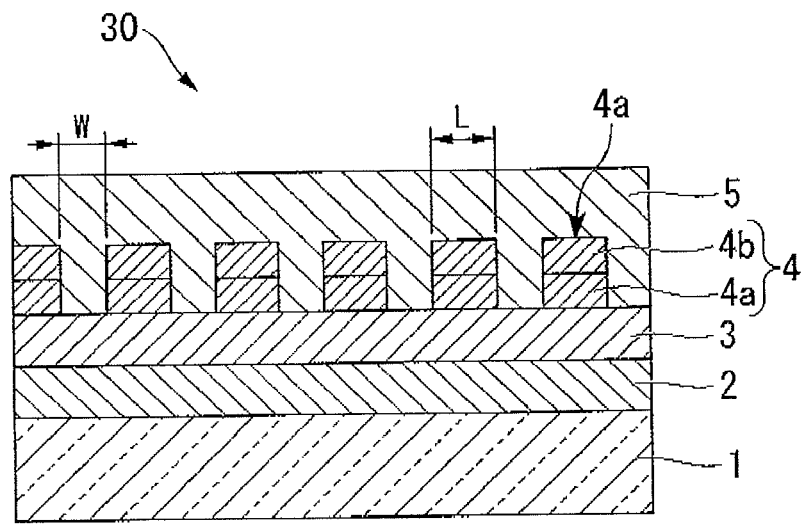
FIG. 3 is a cross-sectional view of an exemplary configuration of a magnetic recording medium to which the invention is applied.

As illustrated in FIG. 3, the magnetic recording medium 30 includes a soft magnetic layer 2, an intermediate layer 3, a magnetic layer 4 having a magnetic recording pattern MP formed thereon, and a protective layer 5. These layers are laminated in this order on a non-magnetic substrate 1. A lubricating film (not illustrated) is formed on an outermost surface.

Any non-magnetic substrate can be employed as the non-magnetic substrate 1. Examples of the non-magnetic substrate include an Al alloy substrate, such as Al—Mg alloy, having Al as a principle component and substrates of normal soda glass, aluminosilicate-based glass, crystallized glass silicon, titanium, ceramic and various resin. Among these, an Al alloy substrate, a glass substrate, such as a crystallized glass substrate, or a silicon substrate, are preferably used for the non-magnetic substrate 1. Average surface roughness (Ra) of these substrates is preferably not more than 1 nm, more preferably not more than 0.5 nm and especially preferably not more than 0.1 nm.

The magnetic layer 4 includes a first magnetic layer 4a and a second magnetic layer 4b laminated to each other. A magnetic recording pattern MP is formed by magnetically separating the magnetic layer 4.

The magnetic layer 4 may be an in-plane magnetic layer for an in-plane magnetic recording medium or a perpendicular magnetic layer for a perpendicular magnetic recording medium. Among these, a perpendicular magnetic layer is especially preferred due to its high recording density. The magnetic layer 4 is preferably made of Co-based alloy. The magnetic layer may be a CoCrPt-based magnetic layer, a CoCrPtB-based magnetic layer and a CoCrPtTa-based magnetic layer. Alternatively, the magnetic layer may have a granular structure in which oxides, such as $SiO_2$ and $Cr_2O_3$, are added to the magnetic layers described above.

The perpendicular magnetic recording medium includes a soft magnetic layer 2, an intermediate layer 3 and a magnetic layer 4 laminated to one another. The soft magnetic layer 2 includes FeCo alloy (e.g., FeCoB, FeCoSiB, FeCoZr, FeCoZrB and FeCoZrBCu), FeTa alloy (e.g., FeTaN and FeTaC) and Co alloy (e.g., CoTaZr, CoZrNB and CoB) which are soft magnetic alloys. The intermediate layer 3 includes Ru. The magnetic layer 4 includes 60Co-15Cr-15Pt alloy or 70Co-5Cr-15Pt-10$SiO_2$ alloy. An orientation controlling film including Pt, Pd, NiCr and NiFeCr may be disposed between the soft magnetic layer 2 and the intermediate layer 3.

An in-plane magnetic recording medium may include an underlying layer of non-magnetic CrMo alloy and a magnetic layer 4 of ferromagnetic CoCrPtTa alloy laminated to each other.

The thickness of the magnetic layer 4a is not less than 3 nm to not more than 20 nm and preferably is not less than 5 nm to not more than 15 nm. The thickness of the magnetic layer 4b is not less than 0.5 to not more than 10 nm and preferably is not less than 1 nm to not more than 5 nm. The thickness of the magnetic layer 4 is selected so that sufficient input and output performance of the head is provided in accordance with the type and the lamination structure of the magnetic alloy used. The thickness of the magnetic layer 4 is selected appropriately so that certain output greater than predetermined output can be provided during reproduction. Usually, parameters representing the recording/reproducing property are impaired as output increases. The magnetic layer 4 is usually formed as a thin film through sputtering.

Among the first magnetic layer 4a and the second magnetic layer 4b provided in the invention, the second magnetic layer 4b functions as a mask layer when the first magnetic layer 4a is subject to ion beam irradiation or other processing. Accordingly, it is preferable that the second magnetic layer 4b be highly resistive to ions used for irradiation. For example, the second magnetic layer 4b can be highly resistive to ions used for irradiation in a configuration in which the first magnetic layer 4a has a granular structure and a second magnetic layer 4b has a non-granular structure.

Preferably, the magnetic layer having a granular structure at least includes Co and Cr as magnetic particles and at least one oxide selected from a Si oxide, a Cr oxide, a Ti oxide, a W oxide, a Co oxide, a Ta oxide and a Ru oxide at a grain boundary section of the magnetic particles. In particular, examples of the oxide include a CoCrPt—Si oxide, a CoCrPt—Cr oxide, a CoCrPt—W oxide, a CoCrPt—Co oxide, a CoCrPt—Cr oxide-W oxide, a CoCrPt—Cr oxide-Ru oxide, a CoRuPt—Cr oxide-Si oxide and a CoCrPtRu—Cr oxide-Si oxide.

An average particle diameter of magnetic crystalline grains having a granular structure is preferably not less than 1 nm to not more than 12 nm. A total amount of oxides in the magnetic layer is preferably from 3 to 15 mol %. Examples of the magnetic layer having non-granular structure include a layer of magnetic alloy including Co, Cr and, preferably, Pt.

Although examples of the protective layer 5 usually include a thin film of diamond-like carbon (DLC) formed by P-CVD or other processes, the invention is not limited to the same. Alternatively, the protective film layer 5 may be a carbonaceous layer including carbon (C), hydrogenated carbon (HxC), carbon nitride (CN), amorphous carbon or silicon carbide (SiC), or other usually employed protective layer materials, such as $SiO_2$, $Zr_2O_3$ and TiN. The protective layer 5 may include two or more layers. The thickness of the protective layer 5 should be less than 10 nm. If the protective layer 5 is thicker than 10 nm, distance between the magnetic head and the magnetic layer 4 is excessively large and thus intensity of the input and output signals becomes insufficient.

Preferably, a lubricating film (not illustrated) may be formed on the protective layer 5 by applying a lubricant. Examples of the lubricant include a fluorine-based lubricant, a hydrocarbon-based lubricant and mixtures thereof. The lubricant is usually applied to the thickness of 1 to 4 nm to provide a lubricating film.

(Magnetic Recording-Reproducing Apparatus)

Figure 4:
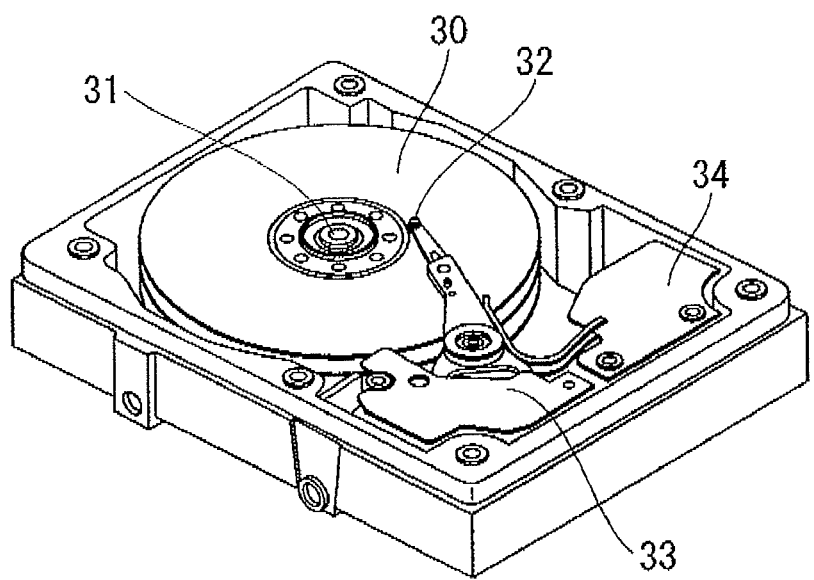
FIG. 4 is a perspective view of an exemplary configuration of a magnetic recording-reproducing apparatus.

An exemplary configuration of a magnetic recording-reproducing apparatus (HDD) to which the invention is applied is illustrated in FIG. 4.

As illustrated in FIG. 4, the magnetic recording-reproducing apparatus to which the invention is applied includes a magnetic recording medium 30, a rotation driving section 31, a magnetic head 32, a head driving section 33 and a recording and reproducing signal processing system 34. The magnetic recording medium 30 is manufactured in accordance with the invention. The rotation driving section (i.e., a medium driving section for driving the magnetic recording medium in a recording direction) 31 drives the magnetic recording medium to rotate. The magnetic head 32 records onto and reproduces from the magnetic recording medium 30. The head driving section (i.e., head moving means for moving the magnetic head relatively with the magnetic recording medium) 33 moves the magnetic head 32 in a radial direction relatively to the magnetic recording medium 30. The recording and reproducing signal processing system (i.e., a recording and reproducing signal processing means) 34 inputs signals to the magnetic head 32 and reproduces signals output from the magnetic head 32.

Since the discrete track magnetic recording medium 30 is used in the magnetic recording-reproducing apparatus, it is possible to eliminate bleeding during writing for magnetic recording onto the magnetic recording medium 30 and to obtain high surface recording density. Since the magnetic recording medium 30 to which the invention is applied is employed, a magnetic recording medium with high recording density can be manufactured with high productivity. Since a recording track of the magnetic recording medium 30 is formed in a magnetically discontinuous manner, the reproducing head may have the same width as that of the recording head. In the related art magnetic recording-reproducing apparatuses, the reproducing head has a smaller width than that of the recording head so as to eliminate influence of a magnetization transition region of a track edge portion. Accordingly, sufficient reproduction output and a high SNR can be obtained.

A reproducing section of the magnetic head 32 is formed by a GMR head or a TMR head. With this configuration, sufficient signal intensity can be obtained even in a magnetic recording-reproducing apparatus having high recording density. Accordingly, a magnetic recording-reproducing apparatus with high recording density can be obtained. A levitation amount of the magnetic head 32 may 0.005 μm to 0.020 μm, which is lower than that in the related art. With this configuration, output is improved and a device SNR is increased. Accordingly, a high-capacity and highly reliable magnetic recording-reproducing apparatus can be provided. A signal processing circuit for maximum likelihood decoding may be employed to further increase recording density. A sufficient SNR can be obtained even when data is recorded and reproduced at, for example, track density of not less than 100 k tracks per inch, linear recording density of not less than 1000 k bits per inch and recording density of not less than 100 G bits per square inch.

The invention can be widely applied to magnetic recording media with magnetically-separated magnetic recording patterns MP provided thereon. Examples of the magnetic recording medium with a magnetic recording pattern provided thereon include a patterned medium in which magnetic recording patterns are arranged regularly for every bit, a medium in which magnetic recording patterns are arranged in a track pattern and a medium in which magnetic recording patterns include servo signal patterns. Among these, a discrete magnetic recording medium in which a magnetically-separated magnetic recording pattern is a magnetic recording track and a servo signal pattern is preferred due to its simplicity in manufacturing.

EXAMPLE

Hereinafter, advantageous effects of the invention will be described in more detail with reference to Example. It should be noted that the invention is not limited to Example below but modification may be made without departing from the spirit and scope of the invention.

Example 1

In Example 1, a vacuum chamber was first evacuated to not more than $1.0 \times 10^{-5}$ Pa with a HD glass substrate disposed therein. The glass substrate used herein was a crystallized glass substrate including $Li_2Si_2O_5$, $Al_2O_3$—$K_2O$, $Al_2O_3$—$K_2O$, MgO—$P_2O_5$ and $Sb_2O_3$—ZnO. The glass substrate had an outer diameter of 65 mm, an inner diameter of 20 mm and an average surface roughness (Ra) of 2 angstrom (i.e., 0.2 nm).

Next, a 60-nm thick FeCoB film as a soft magnetic layer, a 10-nm thick Ru film as an intermediate layer and a 15-nm thick 70Co-5Cr-15Pt-10SiO$_2$ alloy film as a magnetic recording layer were laminated in this order on the glass substrate by DC sputtering.

Resist was applied onto the laminated product to form a 100-nm thick resist layer. The resist herein was ultraviolet-curing Novolak-based resin. Next, a glass stamp having a positive pattern of a magnetic recording pattern was pressed against the resist layer at the pressure of 1 MPa (i.e., about 8.8 kgf/cm$^2$). In this state, the resist layer was irradiated with a 250-nm UV ray for 10 seconds from above the glass stamp so as to cure the resist layer. The glass stamp had UV transmittance of not less than 95%. The stamp is then removed from the resist layer. In this manner, an uneven pattern corresponding to the magnetic recording pattern was transferred to the resist layer.

The uneven pattern transferred to the resist layer corresponded to a magnetic recording pattern having 271 k tracks per inch. The uneven pattern had 64-nm wide circular configurations at recesses and 30-nm wide circular configurations at projections. The thickness of the resist layer was 65 nm and depth of the recess of the resist layer was about 5 nm. The recess was about 90 degrees with respect to the substrate surface.

Next, the recesses of the resist layer were removed through dry etching. Dry etching was conducted for 10 seconds using 10 sccm of $O^2$ gas at pressure of 0.3 Pa, high-frequency plasma power of 300 W and DC bias of 30 W.

Next, a 14-nm thick 70Co-5Cr-15 Pt alloy film was laminated as a second magnetic layer on the first magnetic layer having the resist layer formed thereon.

A surface layer of the second magnetic layer was removed through ion milling until the resist layer was exposed and then the surface was planarized. Ar ion was used for ion milling in an amount of $5 \times 10^{16}$ atoms/cm$^2$ at accelerating voltage of 1000 keV.

Next, the resist layer was removed through dry etching. Dry etching was conducted for 30 seconds using 40 sccm of $O^2$ gas at pressure of 0.3 Pa, high-frequency plasma power of 300 W and DC bias of 30 W.

Next, surfaces of the first and second magnetic layers were irradiated with an ion beam. The ion beam was generated using mixed gas of 40 sccm of nitrogen gas, 20 sccm of hydrogen gas and 20 sccm of neon. The surfaces were irradiated with the ion beam for 60 seconds using ions in amount of $5 \times 10^{16}$ atoms/cm$^2$, at accelerating voltage of 20 keV and at an etching rate of 0.1 nm per second. The first magnetic layer was processed to the depth of 6 nm and the second magnetic layer was processed to the depth of 1 nm. Magnetic property of the second magnetic layer changed very little at this time.

Next, a 5-nm thick carbon film was formed on the first and second magnetic layers by CVD. Finally, a lubricant was applied onto the protective layer to form a lubricating film. In this manner, a magnetic recording medium of Example 1 was obtained.

Evaluation was made on electromagnetic conversion property (SNR and 3T-squash) and head levitation height (i.e., glide avalanche) of the thus-obtained magnetic recording medium of Example 1. Electromagnetic conversion property was evaluated using a spin stand. As heads for evaluation, a perpendicular recording head was used for recording and a TuMR head was used for reading. With these heads, a SNR value and 3T-squash at the time of recording 750 kFCI signals were measured.

It was found that the magnetic recording medium of Example 1 had excellent SNR and 3T-squash and stable head levitation property.

It is apparent that the present invention is not limited to the above Example but may be modified and changed without departing from the scope and spirit of the invention.

What is claimed is:

1. A method for manufacturing a magnetic recording medium having a magnetically-separated magnetic recording pattern, the method comprising:
    a first step of forming a first magnetic layer on a non-magnetic substrate;
    a second step of forming a resist layer on the first magnetic layer, the resist layer being patterned in correspondence with the magnetic recording pattern;
    a third step of forming a second magnetic layer so as to cover a surface of the first magnetic layer having the resist layer formed thereon;
    a fourth step of removing the resist layer together with the second magnetic layer formed thereon; and
    a fifth step of partially removing the first magnetic layer or partially modifying magnetic property of the first magnetic layer.

2. A method for manufacturing a magnetic recording medium according to claim 1, wherein, in the fifth step, a portion of the first magnetic layer is removed where the first magnetic layer is not covered with the second magnetic layer or, magnetic property of that portion of the first magnetic layer is modified.

3. A method for manufacturing a magnetic recording medium according to claim 2, wherein a thickness of the second magnetic layer of the magnetic recording medium is not less than 0.5 nm to not more than 10 nm.

4. A method for manufacturing a magnetic recording medium according to claim 1, wherein, in the fifth step, a surface layer of the first magnetic layer is removed and magnetic property of an underlying layer at the removed portion is modified.

5. A method for manufacturing a magnetic recording medium according to claim 4, wherein, in the fifth step, the surface layer of the first magnetic layer is removed and magnetic property of the underlying layer at the removed portion is modified through irradiation of ion beams.

6. A method for manufacturing a magnetic recording medium according to claim 5, further comprising a step of forming a protective layer without burying a non-magnetic material at a portion where the first magnetic layer is removed through irradiation of ion beams.

7. A method for manufacturing a magnetic recording medium according to claim 1, further comprising, between the third step and the fourth step, a step of removing the second magnetic layer until the resist layer is exposed and planarizing the surface.

8. A method for manufacturing a magnetic recording medium according to claim 1, wherein the first magnetic layer has a granular structure and the second magnetic layer has a non-granular structure.

* * * * *